United States Patent [19]

Beebe

[11] Patent Number: 5,229,954
[45] Date of Patent: Jul. 20, 1993

[54] PROCESS AND APPARATUS FOR PAIRING TIRES AND WHEELS

[75] Inventor: James C. Beebe, Kent, Ohio
[73] Assignee: Illinois Tool Works Inc., Glenview, Ill.
[21] Appl. No.: 556,951
[22] Filed: Jul. 23, 1990
[51] Int. Cl.$^5$ .......................................... G01M 1/22
[52] U.S. Cl. .................................. 364/508; 364/552; 73/146
[58] Field of Search ................ 364/506, 507, 508, 552; 73/146; 33/203

[56] References Cited

U.S. PATENT DOCUMENTS

| | | | |
|---|---|---|---|
| 4,223,386 | 9/1980 | Maruyama et al. | 364/506 |
| 4,479,382 | 10/1984 | Greenhorn et al. | 73/146 |
| 4,763,515 | 8/1988 | Pielach et al. | 73/146 |
| 4,805,125 | 2/1989 | Beebe | 364/506 X |
| 4,815,004 | 3/1989 | Beebe | 364/506 |
| 4,817,421 | 4/1989 | Himmler | 73/146 |
| 4,918,627 | 4/1990 | Garcia et al. | 364/552 |
| 4,969,355 | 11/1990 | Doi et al. | 73/146 |
| 5,027,649 | 7/1991 | Himmler | 73/146 |
| 5,033,003 | 7/1991 | Lees, Sr. | 364/506 X |

OTHER PUBLICATIONS

Schuring, D. J., "Uniformity of Tire-Wheel Assemblies," *Tire Science and Technology*, TSTCA, vol. 19, No. 4, Oct.-Dec. 1991, pp. 213-236; presented at 9th annual meeting of The Tire Society at the University of Akron, Akron, Ohio; Mar. 20-21, 1990.

*Primary Examiner*—Parshotam S. Lall
*Assistant Examiner*—Michael Zanelli
*Attorney, Agent, or Firm*—Ruden, Barnett, McClosky, Smith, Schuster & Russell

[57] ABSTRACT

Tires are measured to determine the value of a parameter indicating a tendency of the tires to cause vibration in a given direction in tire/wheel assemblies. Each measured tire is assigned a tire rank designation in accordance with the order in which its measured value of the magnitude of that parameter falls in relation to the magnitudes of that parameter among a certain group of tires. Wheels are measured to determine the value of a second parameter indicating a tendency of the wheels to cause vibration in tire/wheel assemblies in that same given direction. Each wheel in a certain group of wheels is ranked in accordance with the order in which the magnitude of its second parameter falls in relation to the magnitudes of the second parameter among the other wheels in the group. Tires and wheels having corresponding respective rank designations are paired with one another to be combined into a tire/wheel assembly wherein the tire and wheel are mutually oriented such that the vibrational tendencies of the first and second parameters tend to cancel one another.

97 Claims, 4 Drawing Sheets

PROCESS AND APPARATUS FOR PAIRING TIRES AND WHEELS

FIELD OF THE INVENTION

The invention relates to the field of testing vehicle tires and wheels and pairing them to be mated as tire/-wheel assemblies. More particularly, the present invention relates to a process and apparatus for pairing tires taken from a population of tires with wheels taken from a population of wheels in a manner which optimally reduces the net tendency of tire/wheel assemblies made from the paired tires and wheels to generate self-induced vibration when they are used on a vehicle and which ensures that all tires and wheels making up those populations can be paired with suitable mates.

BACKGROUND OF THE INVENTION

When operated on a vehicle, tire/wheel assemblies sometimes cause annoying vibrations even when they are properly balanced. Complaints concerning such vibration are a costly source of warranty claims made against vehicle manufacturers.

The tendency to cause such vibration arises from at least three sources; structural nonuniformities inherent in the construction of tires, dimensional nonuniformities, particularly radial runout, in wheels and the manner in which the tire and wheel nonuniformities interact with one another. As will become clear, those interactions tend to either add or, preferably, cancel depending on the orientation of the tire with respect to the wheel. As the present invention recognizes, the net degree of such cancellation which can be effected for given populations of tires and wheels also depends importantly upon the manner in which individual tires and wheels are selectively paired. Previous efforts to limit vibration have been directed toward reducing the contributions of all of the above three sources but have focused principally on ensuring that tires and wheels as individual components are as uniform as possible and on orienting the tires and wheels to effect cancellation. However, prior art proposals for pairing tires and wheels in order to maximize cancellation are impractical to implement on a production scale. Moreover, they do not offer optimum performance.

Tire manufacturers typically employ tire uniformity inspection machines to make force variation measurements which characterize the uniformity of construction of tires and thus, their tendency to cause vibration in various directions. Such machines operate by measuring the magnitude and angular orientation of reaction forces generated by the tire along various axes of interest as the tire rolls against the surface of a load wheel under a controlled radial load.

In a typical tire uniformity inspection machine, tires are fed by conveyor to a test station where each tire is mounted upon a chuck, inflated and rotatably driven with its tread surface in forced contact with the circumferential surface of the load wheel. The load wheel rotates on a spindle which is supported on each end by an array of load cells which measure forces acting on the load wheel in directions of interest including the radial direction. To do so, a rotary encoder coupled to the chuck tracks the rotation of the tire by generating a series of equiangularly spaced pulses as the tire rotates. Those pulses, together with the outputs of the load cells, are communicated to a computer associated with the machine. In response to the pulses, the computer samples and stores measurements of the instantaneous force waveforms generated by the load cells in each direction of interest over a complete revolution of the tire. The computer carries out Fourier analysis of those measurements in order to resolve them into harmonic components including the first harmonic and selected higher order harmonics. Each harmonic is conventionally represented in vector form as a magnitude and an angle. The angle of the vector identifies a particular angular location on the tire whereat the highpoint of the harmonic component occurs. Tire uniformity inspection machines commonly include facilities for marking the sidewall of the tire under test at that particular angular location for a specified harmonic, typically the first harmonic. Tires whose force variation values or harmonics thereof exceed desired magnitude limits can then be rejected or subjected to a grinding operation in attempt to correct the problem. However, as noted above, the overall tendency of a tire/wheel assembly to give rise to vibration is not determined solely by the lack of structural uniformity in tires. It is also contributed to by dimensional non-uniformity in wheels.

Dimensional nonuniformities in wheels, such as average radial runout, can also be measured and resolved into harmonic components. Radial runout gives rise to radial force variations in a tire/wheel assembly by interacting with the effective spring rate of the tire mounted on the wheel. For example, assume that the radial runout of a given wheel has a highpoint value of X (inches) at a particular angular location on the wheel. Further assume that a tire having an effective spring constant in the radial direction of k (pounds per inch) is mounted upon that wheel. Ignoring any force variation due to non-uniformity of the tire, such a combination can be expected to generate a radial force component of k times X pounds at that angular location.

Accordingly, it has been the practice in the art to analyze vehicle wheels for dimensional uniformity using wheel uniformity analyzing machines such as the Model SSP-WUA wheel uniformity analyzer manufactured by Akron Standard, an ITW Company to whom the present application is assigned. When equipped with a marking system, such a machine can provide an identifiable mark at a specific location on the circumference of the wheel, such as the circumferential location 180° opposite that of the location corresponding to the angle of the first harmonic of the average radial runout of the wheel.

In a tire/wheel assembly, the harmonics of the radial force variation of the tire and the harmonics of average radial runout characteristics of the wheel (by virtue of the latter's interaction with the spring rate of the tire) combine to produce a resultant force variation harmonics whose magnitudes indicate the tendency of the tire/-wheel assembly as a whole to vibrate. It has been known to attempt to minimize vibration of tire/wheel assemblies by orienting the tire with respect to the wheel such that the angular location of the first harmonic of the radial force variation of the tire lies 180° opposite the angular location of the first harmonic of average radial runout of the wheel. When so mounted, the first harmonic of radial force variation of the tire tends to be at least partially cancelled by force component induced by the first harmonic of radial runout of the wheel and vice versa. This helps to reduce the tendency of the tire/wheel assembly to vibrate in the radial direction when in use. However, since only the angles of the respective harmonics are considered, wheels having large average radial runout magnitudes, can often be paired with tires having large radial force variation magnitudes, or vice versa so that the resultant cancellation will be far from complete. On the other hand, if magnitude of the first harmonic of the average radial runout of the wheel, after being multiplied by the effective spring rate of the tire, happens to be of nearly the same magnitude as the corresponding harmonic of tire radial force variation of the tire, the effective cancellation will be nearly perfect, leaving a resultant force variation first harmonic of small magnitude. Even so, it is not practical, particularly on a production scale, to pair tires and wheels by attempting to match each tire with a wheel selected such that the magnitude of a given harmonic of force expected to be induced by the wheel equals, and can therefore precisely cancel, the corresponding force harmonic contributed by the tire. The reason for this will now be explained with reference to FIG. 1.

FIG. 1 is a graph illustrating a hypothetical distribution function of the magnitudes of a parameter, such the first harmonic of radial force variation among a population of tires (A). Graphed on the same coordinates appears a hypothetical distribution function of the magnitudes of a second parameter, such as the first harmonic of the average radial runout among a population of wheels (B) which has been converted to units of force by multiplying by the effective spring rate of tires (A). Because of inherent manufacturing differences, the respective distributions for tires and wheels will usually differ from one another. Ordinarily, by way of illustrative example only and not limiting of the present invention in any way, the distribution of wheel population (B) can generally be expected to be somewhat narrower (i.e., have a lower standard deviation) and have a lower mean value than that of tire population (A). In the tire uniformity inspection procedure, tires whose first harmonic of radial force variation have a magnitude exceeding a predetermined tire reject limit can be automatically rejected thereby truncating the tire distribution by eliminating those tires in region F as illustrated.

By inspection of FIG. 1, it can be appreciated that if one were to attempt to match each tire from population (A) having a first harmonic of radial force variation of a given magnitude with a wheel from population (B) whose first harmonic of average radial runout is expected to give rise to a force of that same given magnitude, only tires and wheels lying in region C, where the tire and wheel distributions overlap, could be so matched. Even rejecting the worst tires from population (A) (i.e., those from region F) does not solve this problem. Once the supplies of tires and wheels within region C were exhausted, there would remain an excess of wheels having disproportionately small first harmonic of average radial runout magnitudes (region D in FIG. 1) and an excess of tires with much larger (region E in FIG. 1). No matter how those remaining tires and wheels were paired, the resulting tire/wheel assemblies would have quite large radial first harmonic resultants. Thus, while portions (region C) of the tire and wheel populations would be extremely well matched so that the first harmonics contributed by the tires would almost perfectly cancel the first harmonics contributed by the wheels, the remaining portions (regions D and E) of the populations would be grossly mismatched due to the lack of suitable mates. As a result, the tire/wheel assemblies produced from the components in regions D and E would have a much greater tendency to vibrate when used on a vehicle.

Although the two curves in FIG. 1 are hypothetical and could vary in size, shape and even relative position, one can appreciate that the above problem would always occur using the pairing technique discussed above, at least to some degree, except in the unlikely event that the two curves happened by chance to completely overlap one another. On the opposite extreme, the tire and wheel distribution curves might be spaced apart and not have any substantial areas of overlap. In that event, little if any pairing by matching the respective magnitudes of corresponding force harmonics contributed by tires and wheels on the other would be possible. Under those circumstances, if tires and wheels from adjacent ends of the two curves were paired, the tires and wheels paired from the opposite ends of the two curves would be severely mismatched:

In addition to the tendency to leave portions of the tire and wheel populations without suitable mates, it is also quite impractical and expensive on a production scale to attempt to pair tires and wheels by individually selecting a wheel such that the measured magnitude of a given harmonic of radial force variation of that tire equals the magnitude of the corresponding radial force harmonic which will be contributed by the radial runout of the wheel through its interaction with the spring rate of the tire. In order to do so, it would be necessary to determine the magnitude of that harmonic for nearly every tire as well as the magnitude of the corresponding harmonic of radial force expected to be contributed by nearly every wheel in the respective populations of tires and wheels prior to making even the first tire/wheel assembly. It would also be necessary to have all or nearly all the tires and wheels physically stored in a readily accessible manner and to maintain records of the magnitudes of their respective force harmonics. Tires and wheels having identical or nearly identical magnitudes would then have to be selected, removed from storage and brought to a tire/wheel assembly station to be mounted in the proper mutual orientation.

Such a technique would impose enormous physical storage and material handling problems which would grow disproportionately as the size of the tire and wheel populations to be accommodated were increased. For example, production runs of tires and wheels numbering the tens or even hundreds of thousands of units are not uncommon. The size, cost and complexity of a system for physically storing such enormous batches of tires and wheels as well as the elaborate equipment which would be needed to select and physically retrieve individual tires and wheels from those enormous batches renders it highly impractical to attempt to pair tires and wheels by individually selecting wheels and tires from large populations of wheels and tires such that the measured magnitude of a given harmonic of radial force variation of each tire equals the magnitude of the corresponding harmonic of radial force expected to be contributed by a particular wheel.

SUMMARY OF THE INVENTION

In view of the foregoing, there is a need for a process and apparatus for pairing individual tires and wheels from respective populations of tires and wheels in a manner which optimally reduces the residual force vectors of the resulting group of tire/wheel assemblies considered as a whole.

There is further a need for such a process and apparatus wherein every tire and wheel in those populations can be paired with a suitable mate so as not to produce gross disparities in the residual force variation characteristics of the resulting population of tire/wheel assemblies.

There is further a need for a process and apparatus of the types referred to above which can be economically implemented on a production scale and which do not require facilities for physically storing excessive numbers of tires and wheels in order to pair them.

There is further a need for a process of the types referred to above which can be implemented as a continuous process wherein tires and wheels are continuously taken up for pairing and appropriately paired tires and wheels are continuously delivered for combining into tire/wheel assemblies.

The present invention addresses the above needs by providing an apparatus and process for pairing tires and wheels wherein tires are measured to determine the value of a parameter indicating a tendency of the tires to cause vibration in a given direction in tire/wheel assemblies. Each measured tire is assigned a tire rank designation in accordance with the order in which its measured value of the magnitude of that parameter falls in relation to the magnitudes of that parameter among a certain group of tires. Wheels are likewise measured to determine the value of a second parameter indicating a tendency of the wheels to cause vibration in tire/wheel assemblies in that same given direction. Each wheel in a certain group of wheels is ranked in accordance with the order in which the magnitude of its second parameter falls in relation to the magnitudes of the second parameter among the other wheels in that group. Tires and wheels having corresponding respective rank designations are paired with one another to be combined into a tire/wheel assembly wherein the tire and wheel are mutually oriented such that the vibrational tendencies of the first and second parameters tend to cancel one another.

In a preferred embodiment, the first parameter comprises the magnitude and angle of a selected harmonic, preferably the first harmonic, of the radial force variation of the tire which can conveniently be measured using a conventional tire uniformity measuring machine. The second parameter comprises the corresponding harmonic (i.e., the first harmonic) of a dimensional non-uniformity; specifically, the average radial runout of the wheels which can be conveniently measured by a conventional wheel uniformity analyzer which, in addition to carrying out any other desired wheel measurements can also optionally identify wheels to be rejected. The wheel uniformity analyzer also indicates the angle of the second parameter such as by marking the wheel at an angular location 180° opposed therefrom. After being measured, a group made up of a selected limited number, N, of one component, e.g., non-rejected wheels, is accumulated in a queue.

A computer sorts the wheels in the queue into a predetermined order, such as a non-decreasing numerical order in accordance with the measured magnitudes of the second parameter. Based on the outcome of this sorting, each wheel in the queue is assigned a unique wheel rank designation such as one of a consecutive series of ordinal wheel rank numbers ranging from 1 through N. The rank designation indicates how each wheel in the queue compares to the other wheels present in the queue at that time in terms of the magnitude of its second parameter. For instance, assuming the wheels where sorted into a non-decreasing numerical order by magnitude, the wheel whose second parameter has the smallest magnitude of those in the queue would be assigned a rank number of 1 while the wheel whose second parameter has the largest magnitude of those in the queue would be assigned a rank designation of N. For any given wheel, its wheel rank number (or other rank designation) is independent of the magnitude itself in the sense that for any given wheel one cannot determine its rank number (or other rank designation) from its magnitude value alone nor can its magnitude value be determined from its rank number alone. When a wheel is pulled from the queue in order to be mated with a tire at an adjacent pairing station, a new wheel enters the queue whereupon new rank numbers are assigned to all the wheels in the queue as necessary in accordance with the system just described.

The other component of the tire/wheel assemblies, i.e., tires, are preferably brought to the pairing station directly from a tire uniformity inspection machine without any intermediate physical accumulation of tires. In addition to carrying out any other desired measurements and optionally identifying tires to be rejected, the machine measures the first parameter, which, as noted previously, preferably comprises the magnitude and angle of the first harmonic of radial force variation of the tires and indicates the angle of that harmonic such as by marking the wheel at the corresponding angular location thereon.

The computer then assigns the tire a unique tire rank designation such as one of a series of N consecutive tire rank numbers ranging from 1 through N. To do so, the computer has stored in its memory the magnitude of the first parameter of the tire just measured and delivered to the pairing station as well as the magnitudes of N-1 other tires, preferably the N-1 tires most recently measured prior to the aforementioned tire just measured. The computer sorts those N magnitude values (i.e., those of N-1 other tires and the tire just measured) according to the same predetermined order (e.g., non-decreasing numerical order) that the wheels in the queue are sorted into. Based on the outcome of sorting the tire at the pairing station is assigned a tire rank number from 1 to N which indicates how the magnitude of the first parameter of that tire compares to the magnitudes of the first parameter of the N-1 tires recorded in the memory of the computer. The number N is selected to be large enough to provide a representative sample of the populations of both tires and wheels but is preferably as small as possible for economy of implementation.

The computer then identifies that particular wheel in the queue whose wheel rank number corresponds to the tire rank number of the tire and initiates delivery of that wheel to the pairing station. When the paired tire and wheel are assembled, the angular location on the tire corresponding to the angle of the first parameter is oriented 180° opposite the angular location on the wheel corresponding to the angle of the second parameter so that the vibrational tendencies of the first and second parameters cancel one another.

Since the invention cannot influence the distribution curves of the incoming populations of tires and wheels to be paired, it cannot assure that the magnitude of the residual force vector of the resulting tire/wheel assemblies will always be acceptably small. However, the invention does provide optimum results in the sense that for given populations of tires and wheels, tire/wheel assemblies produced in accordance with the invention will, as a group, have the lowest possible residual radial force variation and will therefore be freer of radial vibration than has heretofore been possible.

BRIEF DESCRIPTION OF THE DRAWINGS

The objectives and features of the present invention will become more readily apparent taken in conjunction with the accompanying drawings in which.

DETAILED DESCRIPTION OF THE INVENTION

Figure 1:
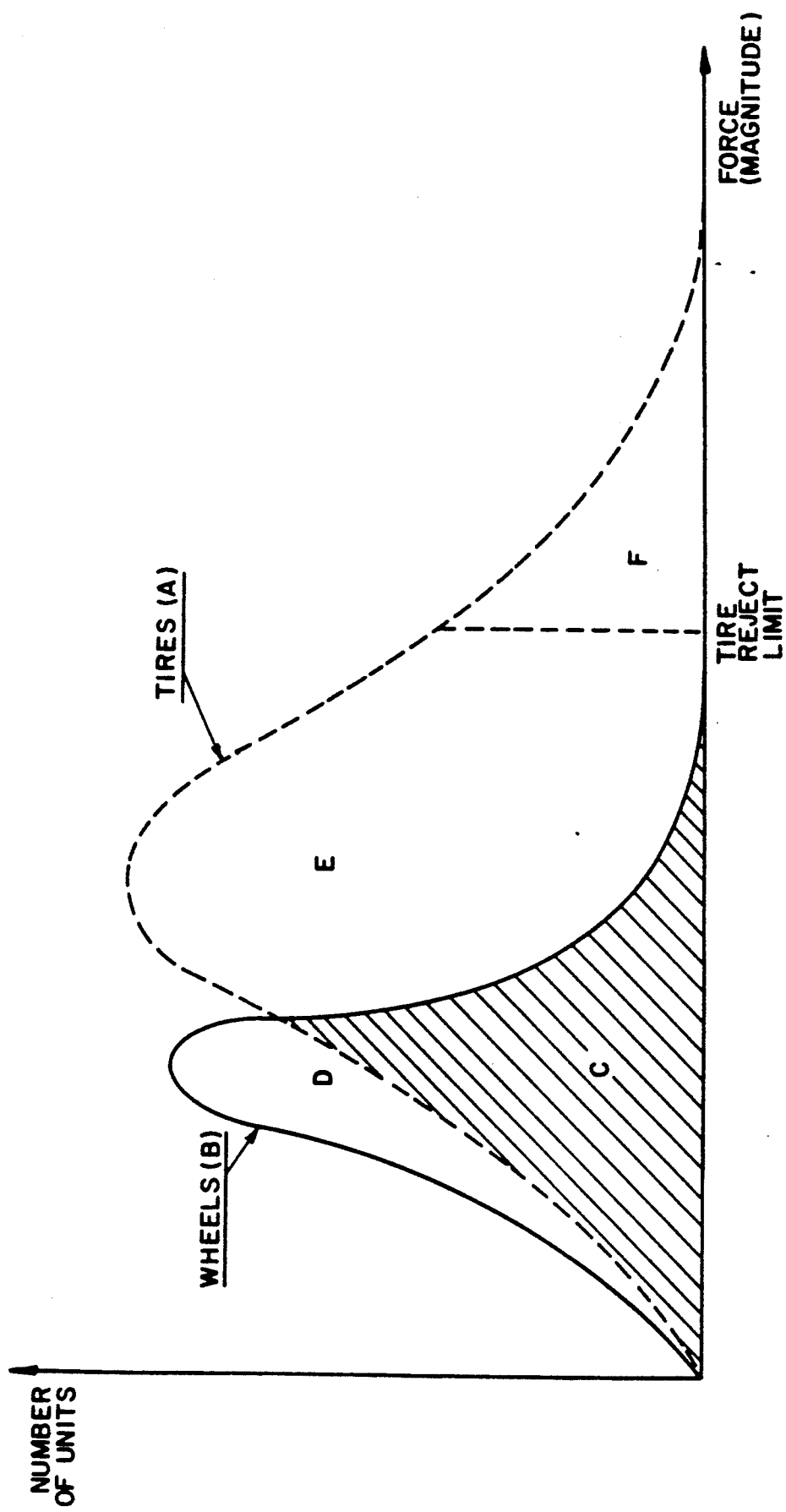
FIG. 1, as described above, is a graph showing the distribution of the magnitude of the first harmonic of radial force variation of a population (A) of tires and a representation of the average radial runout of a population (B) of wheels, the latter having been converted to units of force by multiplying the effective radial spring rate of tires A.

FIG. 1 shows an unranked population 10 of tires 11 as well as an unranked population 12 of wheels 13 which are to be paired in accordance with the invention. Each population 10, 12 contains at least an arbitrary number, M, of tires and wheels, respectively. Unranked wheels 13 are delivered to a wheel uniformity analyzer 14 such as a Model SSP-WUA available from Akron Standard, an ITW company of Akron, Ohio. There, the magnitude and angle of a first parameter, such as the first harmonic of average radial runout, which is correlated to a tendency of wheels to give rise to radial vibration in tire/wheel assemblies is measured. As indicated at 18, wheel uniformity analyzer 14 can optionally be used to reject any wheels 13 having particular measured quantities which exceed predetermined limits. Uniformity analyzer 14 then identifies the angular location on wheel 13 which corresponds to the angle of the first parameter by imparting a visible mark 16 to each non-rejected wheel at an angular location which lies 180° opposite that angular location on wheel 13.

Once so measured, each wheel 13 is delivered, by a conveyor 20, to an identifiable location in an accumulator or queue 23 wherein that wheel 13 is temporarily physically stored among a group of previously measured wheels. As illustrated, queue 23 may conveniently take the form of a rotary table 24 whose angular position can be adjusted by means of a conventional mechanical indexer 25. In accordance with an important aspect of the invention, the group of wheels 13 held in queue 23 includes a predetermined number, N, of wheels 13 which number is selected in a manner to be described below. Selecting the number N to be equal to about twenty-five (25) has been found to offer excellent results in pilot tests although, for convenience of illustration only, N is set at a smaller number, namely ten (10) in FIG. 2.

The number N of wheels in queue 23 must be a number less than or equal to the aforementioned number M and must be large enough to provide a representative sample of the distribution of the magnitudes of a second parameter, such as the first harmonic of radial force variation, of the incoming population 10 of unranked tires 11 which is correlated to a tendency of those tires 11 to cause radial vibration in tire/wheel assemblies. At the same time, N must also be large enough to provide a representative sample of the distribution of the magnitudes of the above-described first parameter characterizing the incoming population 12 of unranked wheels 13. If a larger number of units is required to provide a representative sample of one component than the other, then the larger of the two numbers should be selected as N. For example, assume that the incoming population 12 of unranked wheels 13 can be suitably characterized with only a sample size say fifteen (15) wheels but that say twenty-five (25) tires are required to provide a representative sample of the distribution among the incoming population 10 of tires 11. In that case, N must be selected, as a minimum, at twenty-five (25). It should be noted that N in the above example would be twenty-five (25) irrespective of whether tires 11 or wheels 13 were selected to be the component temporarily physically stored in the queue 23.

If the value of N selected is too small, the residual radial force variation characterizing the resulting tire/wheel assemblies will be higher than those obtainable using a value for N equal to the number of tires 11 or wheels 13 making up populations 10 or 12, respectively, whichever of the two requires the larger sized sample to obtain a representative sample. On the other hand, performance of the invention will not suffer if N is selected to be too large a value. However, for best economy and efficiency of operation, N should be kept as small as possible without increasing the residual force values of the resulting tire/wheel assemblies over what the user of the invention considers to be an acceptable amount over those possible if N were equal to the size of the incoming populations 10 or 12 whichever requires the larger sample size. What constitutes such an acceptable amount will depend on the degree of improvement desired and on customer requirements as well as on the degree of improvement in performance possible by making an incremental increase in the value of N as compared to the incremental cost of implementing such an increase. However, those determinations are well within the purview of those skilled in the art utilizing conventional optimization techniques. Further in accordance with the invention, each wheel 13 in queue 23 is ranked in a manner which will now be described.

Wheel uniformity analyzer 14 communicates data indicating the magnitude of the first harmonic of the average radial runout of each wheel 13 delivered to queue 23 to a computer 28 by way of a signal 30. Computer 28 assigns each wheel 13 in queue 23 one of a series of N rank designations having an arbitrary predetermined order such as a series of consecutive ordinal wheel rank numbers ranging from 1 through N. The wheel rank number of each wheel 13 newly delivered to queue 23 from the remainder of population 12 is assigned by computer 28 based on the magnitude of the first harmonic of average radial runout of that particular wheel 13 in relation to the magnitudes of the first harmonic of the average radial runouts of each of the N-1 wheels 13 previously delivered to queue 23.

Figure 2:
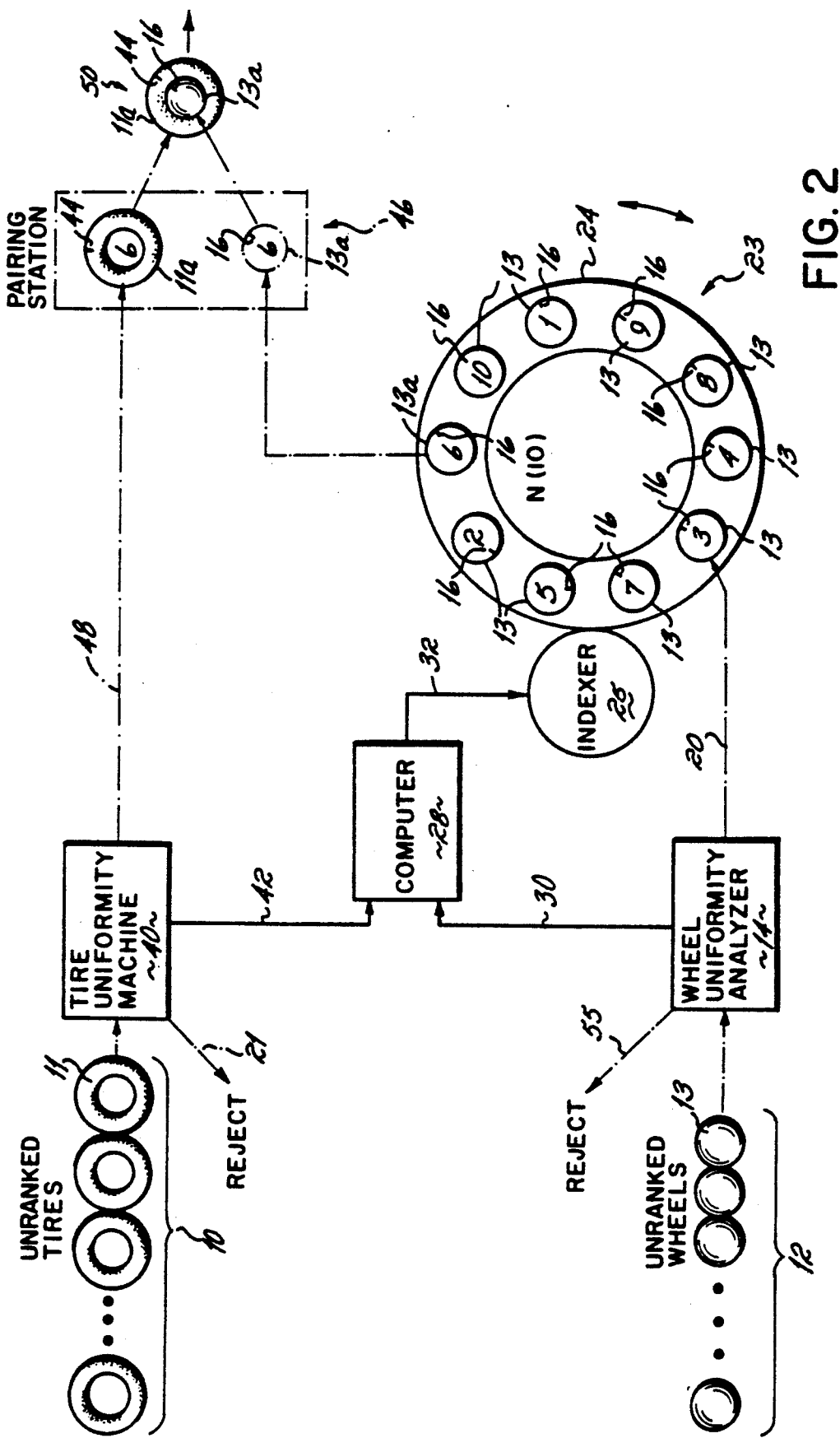
FIG. 2 is a schematic diagram illustrating the apparatus of the present invention.

To do so, computer 28 sorts all the wheels 13 then physically present in queue 23 using as keys the magnitudes of the first harmonic of average radial runout value of each wheel. Computer 28 then assigns each wheel 13 in queue 23 an ordinal rank number based on the outcome of the sorting. For example, if a given wheel 13 has a maximum radial runout of 0.019 inches and that magnitude happens to be the third highest (if a non-decreasing ranking order is used) or third lowest (if a non-increasing ranking order is used) among the N wheels then present in queue 23, computer 28 will assign that wheel a wheel rank number of three (3) as illustrated in FIG. 2. Computer 28 ranks each of the other N-1 wheels 13 in queue 23 in the same manner. For illustration purposes in FIG. 2, the center portion of each wheel 13 shown in queue 23 is marked with a wheel rank number. It is to be understood, however, that the rank numbers need not be physically marked on the wheels. All that is required is that computer 28 store the wheel rank numbers and track the physical location of each wheel 13 in the queue 23. The latter task can conveniently be accomplished in open-loop fashion by driving indexer 25 with a digital drive signal 40 generated by computer 28 whereby computer 28 can monitor the angular position of rotary table 24 at all times and note that position when each wheel 13 is newly placed thereon. Alternatively, computer 28 could track the location and wheel rank number of each wheel 13 in queue 23 using conventional position feedback techniques.

Concurrently with the processes of measuring and ranking wheels 13 as just described, a given tire 11a from population 10 is conveyed to a conventional tire uniformity machine 40 which may suitably comprise a model 70 TUG manufactured by Akron Standard, an ITW company of Akron, Ohio. Machine 40 determines the magnitude and angle of a selected harmonic, preferably the first order harmonic of radial force variation the tire and communicates data indicating that magnitude via a signal 42 to computer 28. Optionally, machine 40 can carry out other conventional tire uniformity measurements and, as indicated at 21, reject any tires which do not meet predetermined standards. For instance, tires whose radial force variation or selected harmonics thereof exceed specified magnitude reject limits can optionally be rejected. Machine 40 also includes means for indicating the angle of the first harmonic of radial force variation of each tire 11. This can readily be accomplished by equipping machine 40 with conventional marking means for making a visible mark 44 at the angular location on tire 11a corresponding to the angle of the first harmonic of radial force variation in the manner of marking well known in the art.

Once the magnitude of its first harmonic of radial force variation has been measured, computer 28 stores that information as a record in memory together with records of the magnitudes of the first harmonic of radial force variation of the last N-1 non-rejected tires (i.e., the N-1 non-rejected tires most recently measured by machine 40). Tire 11a is then delivered to a pairing station 46 as indicated at 48 in FIG. 2.

In accordance with the invention, computer 28 assigns tire 11a a tire rank designation selected from a series of tire rank designations. Each tire rank designation in the series corresponds to one of the wheel rank designations assigned to the wheels 13 in queue 23 and preferably comprises one of a series of N consecutive tire rank numbers ranging from 1 through N. To select the particular tire rank number to be assigned to wheel 11a, computer 28 sorts by magnitude the N records of second parameter values stored in its memory (i.e., the record of the magnitude of the second parameter of tire 11a as well as the records of the magnitudes of the second parameter of the N-1 tires measured by machine 40 immediately prior to tire 11a) into the same predetermined order (i.e., non-decreasing order) into which the wheels 13 in queue 23 are sorted. Conversely, if the wheels 13 in queue 23 were sorted into some other predetermined order, such as a non-increasing order, that same other order would be used for sorting tires. Computer 28 then selects a particular tire rank number to be assigned to tire 11a based on the outcome of that sorting.

For instance, assume that tire 11a has a first harmonic of radial force variation whose magnitude is 6.4 lbs. and that that figure is the sixth highest (if using ascending rankings) or sixth lowest (if using descending rankings) among the corresponding magnitudes of the last N-1 tires (a total of N tires counting tire 11a itself) delivered to pairing station 46. In accordance with the example, tire 11a would be assigned a rank number of six (6) as illustrated in FIG. 2. Note that the tire rank number need not be marked on tire 11a. All that is required is its rank number be stored in the memory of computer 28 in a manner which permits it to be identified with tire 11a. Note also that the last N-1 tires need not be, and preferably are no longer physically available as separate units at the time tire 11a is ranked. Rather, those N-1 tires preferably have previously been paired with wheels and have preferably already been removed from pairing station 46 as completed tire/wheel assemblies. All that is required is that computer 28 maintain records of the magnitudes of the second parameter of those last N-1 tires stored in its memory. Those records are updated continuously on a first-in-first-out (FIFO) basis such that when a given tire is initially measured by machine 40 a record of the magnitude of its second parameter will be stored temporarily by computer 28 until such time as N subsequent tires are measured whereupon the record for that given tire is deleted from memory. This ensures that each newly measured tire is always ranked in relation to the N-1 tires measured most recently before it.

Based on the tire rank number of the tire 11a delivered to the pairing station 46 computer 28 generates a drive signal 32 appropriate to cause indexer 25 to rotate rotary table 24 to an angular position such that the wheel 13a thereon having the wheel rank number (i.e., 6 in the example) can be offloaded from table 24 to the pairing station 46. At the pairing station, tire 11a is mounted upon the correspondingly ranked wheel 13a from queue 23, i.e., that wheel having the same wheel rank number as the tire rank number of tire 11a (i.e., 6 in the example). The tire and wheel are oriented with respect to one another and the tire 11a mounted upon the wheel 13a such that the mark 44 on the tire 11a angularly aligns with the mark 16 on the wheel 13a to effect maximum cancellation of the respective tendencies of the tire 11a and wheel 13a to cause vibration in the radial direction in the resulting tire/wheel assembly 50.

Computer 28 then causes table 24 to rotate under its control so that a new wheel 13 from uniformity analyzer 14 can be loaded into the position on table 24 previously occupied by the wheel 13a just delivered to the pairing station 46. All the wheels 13 then present in queue 23 are again ranked in accordance with the ranking technique described above. Likewise a new tire 11 is tested on tire uniformity machine 40, ranked in the manner described above and delivered to pairing station 46 to be paired with that wheel from queue 23 having the same wheel rank number (or other rank designation) as the tire rank number of that tire. The above operation repeats indefinitely until all tires and wheels making up populations 10 and 12, respectively have been paired or until one of those populations is exhausted.

Figure 3:
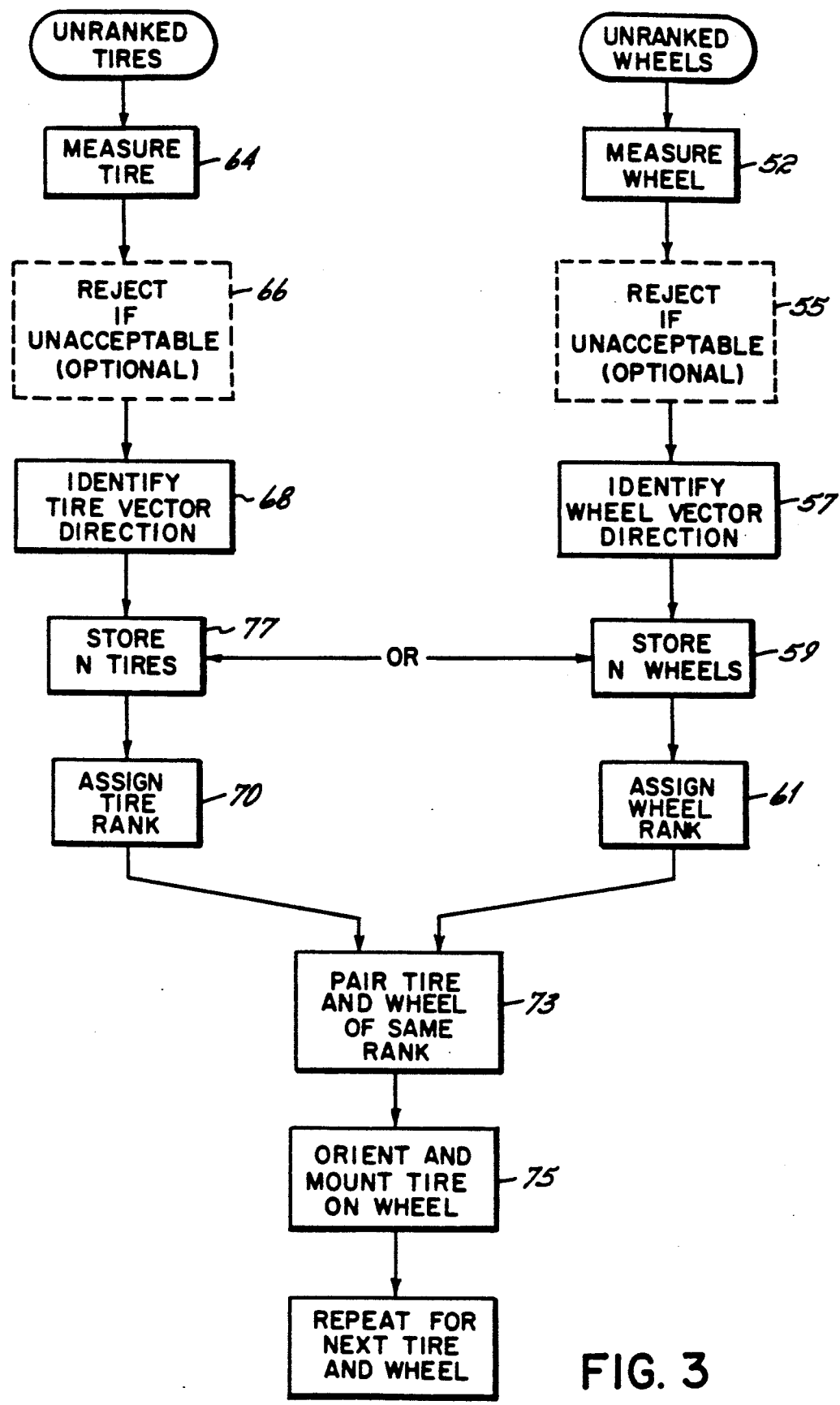
FIG. 3 is a flow chart illustrating the method of the present invention as carried out by the apparatus of FIG. 2.

The process of the invention is illustrated in FIG. 3 taken in conjunction with FIG. 2. The following description assumes that at least N-1 tires and wheels have been previously processed in the manner to be described.

The next unranked wheel 13 is loaded into wheel uniformity analyzer 14 and its first parameter (which comprises the magnitude and angle of the first harmonic of its average radial runout in the preferred embodiment) is measured in a step 52. Assuming the wheel 13 is not rejected in an optional step 55, the magnitude of its first parameter is stored in computer 28 together with the corresponding magnitudes of the first parameter of the other N-1 wheels stored temporarily in queue 23. Assuming the wheel 13 is not rejected in an optional step 55, the angular location on wheel 13 corresponding to the angle of its first parameter as measured is identified in a step 57. To do so, wheel uniformity analyzer 14 can make a mark 16 on the wheel at an angular location 180° opposed from the location corresponding to the angle of its first parameter. In the embodiment illustrated in FIG. 2, the wheel 13 just measured is temporarily physically stored, in a step 59, in a queue 23 which contains a total of N wheels (i.e., the wheel last measured in step 52 and the N-1 wheels so measured in sequence immediately prior thereto). The computer 28 tracks the physical locations of each wheel in queue 23. In a step 61 computer 28 ranks the newly stored wheel along with each of the other N-1 wheels in queue 23 in accordance with the magnitude of its first parameter in relation to the magnitudes of the first parameter as measured for the other N-1 wheels in queue 23 in the manner described earlier.

Preferably carried out concurrently with the above steps, tire uniformity machine 40 measures, in a step 64, the magnitude and location of the second parameter (which comprises the magnitude and angle of the first harmonic of radial force variation in the preferred embodiment) of the next unranked tire 11a taken from population 10. Optionally, other tire uniformity measurements can be carried out at the same time and the tire rejected in an optional step 66 if it fails to meet predetermined uniformity standards. In a step 68, machine 40 identifies the angular location on tire 11a corresponding to the angle of the second parameter as measured by applying a mark 44 to the tire 11a at the appropriate angular location. In a step 70, computer 28 assigns a tire rank designation to the tire in accordance with the magnitude of its second parameter relative to the magnitudes of the second parameter as measured for the last N-1 tires previously measured by machine 40, which magnitudes computer 28 maintains in memory.

In accordance with the invention, computer 28 carries out a pairing step 73 wherein the computer identifies that particular wheel 13a in queue 23 having a wheel rank designation corresponding to the tire rank designation of tire 11a. In an orientation and mounting step 75, the tire 11a and wheel 13a are properly oriented with respect to one another such as by angularly aligning their respective marks 44 and 16 in order to effect the maximum amount of cancellation possible for that particular tire and wheel pair. The tire 11a is then mounted on the wheel 13a to form a completed tire/wheel assembly 50. The above steps are then repeated for the next unranked tire and wheel from the remainder of populations 10 and 12.

ALTERNATIVE EMBODIMENT

Figure 4:
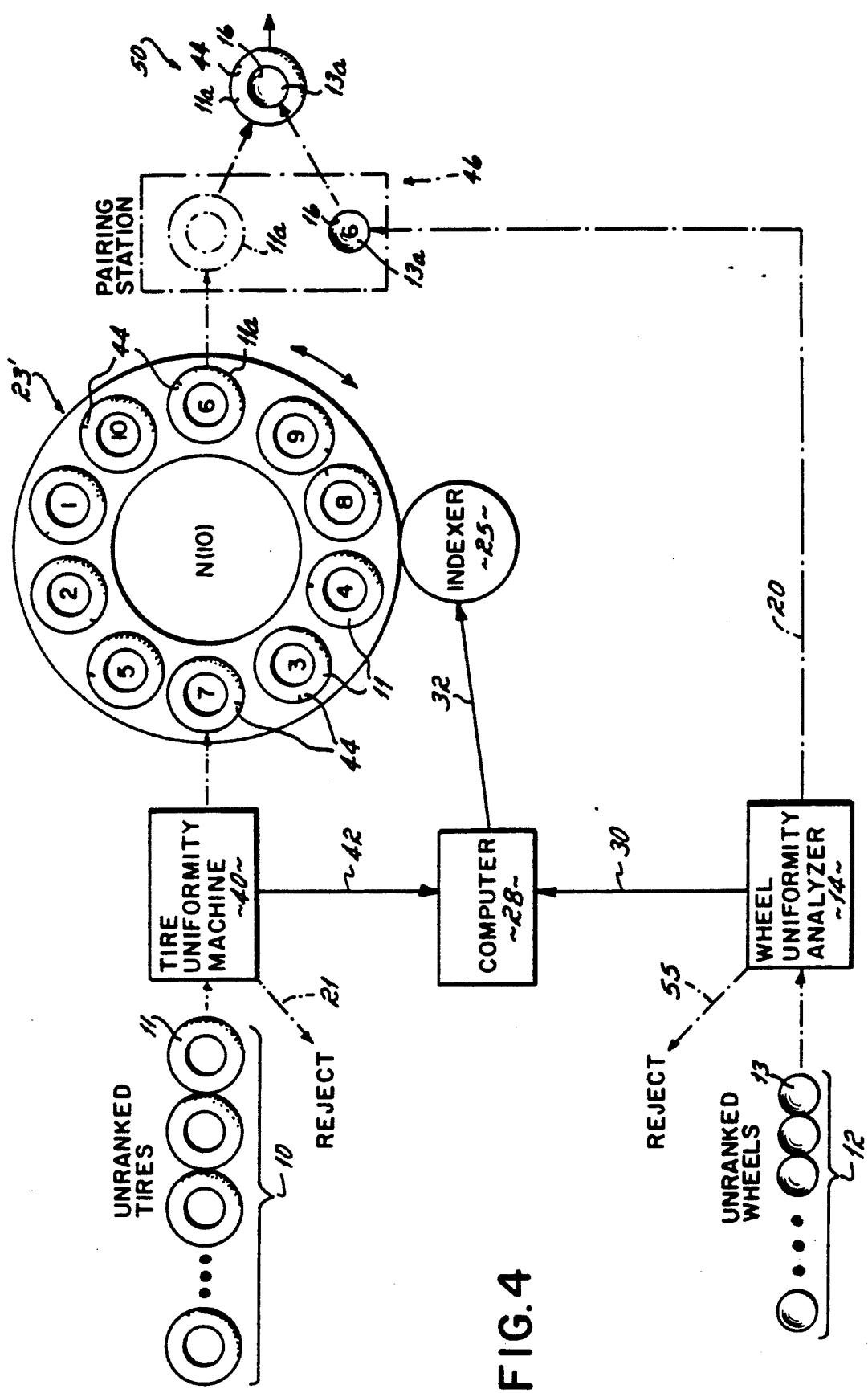
FIG. 4 is a schematic diagram of an alternative embodiment of the apparatus of the invention.

In the embodiment described above, wheels 13 were accumulated in a queue whereas tires 11 were passed directly to the pairing station. However, the choice of which component of the tire/wheel assembly is accumulated in the queue is an arbitrary one. As FIG. 3 indicates, in lieu of step 59, where wheels are stored in the queue, one could substitute a step 77 of storing N tires in such a queue. FIG. 4 illustrates an alternative apparatus of the invention which so operates. The operation of the apparatus of FIG. 4 corresponds to the operation of the apparatus of FIG. 2 as described above except that instead of passing tires directly from machine 40 to the pairing station 46 the tires are accumulate in a queue 23'. Each tire in queue 23' is ranked based on the magnitude of a parameter measured by machine 40, such as the first harmonic of radial force variation of that tire relative to the corresponding magnitudes of each of the other tires present in queue 23 at that time. Conversely, instead of being accumulated in a queue 23 as in FIG. 2, the wheel 13a most recently measured by wheel uniformity analyzer 14 is passed directly to the pairing station 46. The wheel 13a is assigned a rank designation based on the magnitude of another parameter such as the first harmonic of average radial runout of that wheel as compared to the corresponding magnitudes of the N-1 wheels measured by analyzer 14 immediately prior to wheel 13a. In a manner analogous to the operation of the embodiment of FIG. 2, computer 28 selects from the queue 23' that tire whose rank designation corresponds to that of the wheel 13a at the pairing station 46 whereupon that tire and wheel are oriented in the manner described earlier and combined to form a tire/wheel assembly.

While the process and apparatus described herein constitute a preferred embodiment of the invention, it is to be understood that the invention is not limited to the particular form described since, in light of the present disclosure those skilled in the art will readily recognize changes which can be made thereto without departing from the scope of the invention as particularly pointed out and distinctly claimed in the appended claims including all legal equivalents.

What is claimed is:

1. A process for pairing tires and wheels to be formed into tire/wheel assemblies, said process comprising the steps of:
    (a) assigning each wheel in a group of wheels from a population of wheels a wheel rank designation from a series of wheel rank designations, each said wheel rank designation indicating the relative tendency of a given said wheel to cause vibration in a given direction in tire/wheel assemblies as compared to the other wheels in said group of wheels;
    (b) assigning a tire from a population of tires a tire rank designation from a series of tire rank designations, each said tire rank designation in said series of tire rank designations corresponding to a respective wheel rank designation in said series of wheel rank designations, said assigned tire rank designation indicating the relative tendency of said tire to cause vibration in said given direction in tire/wheel assemblies as compared to a plurality of other tires from said population of tires; and (c) pairing said tire with that particular wheel from among said group of wheels having a wheel rank designation which corresponds to the tire rank designation of said tire.

2. The process of claim 1 wherein step (a) thereof includes the steps of:
(i) for each said wheel in said group of wheels, measuring a first parameter correlated to said tendency of said wheel to cause said vibration, and
(ii) sorting said wheels in said group of wheels into order according to the magnitudes of said first parameter to determine said wheel rank designation for each of said wheels in said group of wheels.

3. The process of claim 2 wherein said order is either a non-decreasing numerical order or a non-increasing numerical order.

4. The process of claim 2 wherein said first parameter is correlated to the magnitude of the first harmonic of the average radial runout of each said wheel.

5. The process of claim 2 wherein said first parameter is correlated to both the magnitude and angle of the first harmonic of the average radial runout of each said wheel.

6. The process of claim 1 further comprising the step of forming a tire/wheel assembly by mounting said tire upon said particular wheel in an orientation selected to minimize vibration in said direction when said tire/wheel assembly is in use.

7. The process of claim 1 wherein step (b) thereof includes the steps of:
(i) for a group of N tires including said tire and N-1 said other tires, measuring a second parameter correlated to said tendency of said tires to cause said vibration, and
(ii) sorting the tires in said group of tires into order according to the magnitudes of said second parameter to determine said tire rank designation of said tire.

8. The process of claim 7 wherein said order is either a non-decreasing numerical order or a non-increasing numerical order.

9. The process of claim 7 wherein said direction is the radial direction and said second parameter is correlated to radial force variation.

10. The process of claim 9 wherein said second parameter is correlated to the first harmonic of radial force variation.

11. The process of claim 1 wherein said populations of tires and wheels are each at least M units in number, and wherein:

$$N \leq M$$

where N is the number of wheels in said group of wheels.

12. The process of claim 11 wherein N is selected to be a number large enough to provide a representative sample of said population of tires with respect to said tendency of said tires to cause said vibration in tire/wheel assemblies.

13. The process of claim 11 wherein N is selected to be a number large enough to provide a representative sample of said population of wheels with respect to said tendency of said wheels to cause said vibration in tire/wheel assemblies.

14. The process of claim 11 wherein N is selected to be a number large enough to provide representative samples of said population of tires and said population of wheels with respect to said respective tendencies of tires and wheels in each respective population to cause said vibration in tire/wheel assemblies.

15. The process of claim 11 wherein N is a number which is both:
(i) smaller than the number of wheels in said population of wheels, and
(ii) large enough to provide a representative sample of at least one of said populations with respect to said respective tendency of the tires and/or wheels therein to cause said vibration in tire/wheel assemblies.

16. The process of claim 1 wherein said wheel rank designation is assigned based on the magnitude of a selected harmonic of the average radial runout of a surface feature of each said wheel in said group of wheels as compared to the magnitude values of said selected harmonic of the average radial runouts of said other wheels in said group of wheels.

17. The process of claim 1 wherein said tire rank designation is assigned based on the magnitude of a second parameter of said tire as compared to the magnitudes of said second parameter of said other tires.

18. The process of claim 17 wherein said second parameter is correlated to the first harmonic of radial force variation.

19. The process of claim 1 further comprising the step of accumulating said group of wheels in a queue.

20. A process for pairing tires and wheels to be formed into tire/wheel assemblies, said process comprising the steps of:
(a) taking a wheel from a population of wheels until a group of wheels is formed;
(b) assigning each wheel in said group a wheel rank designation from a series of wheel rank designations, each said wheel rank designation indicating the relative tendency of a given said wheel to cause vibration in a given direction in tire/wheel assemblies as compared to the other wheels in said group;
(c) assigning a tire from a population of tires a tire rank designation from a series of tire rank designations, each tire rank designation in said series of tire rank designations corresponding to a respective wheel rank designation in said series of wheel rank designations, said assigned tire rank designation indicating the relative tendency of said tire to cause vibration in said direction in tire/wheel assemblies as compared to a plurality of other tires from said population of tires;
(d) removing from said group a particular wheel having a wheel rank designation which corresponds to the tire rank designation of said tire and pairing said tire with said particular wheel to be combined as a tire/wheel assembly, and
(e) repeating steps (a) through (d), above.

21. The process of claim 20 further comprising the step of, prior to step (e):
forming a tire/wheel assembly by mounting said tire on said particular wheel in an orientation selected to minimize vibration in said direction when said tire/wheel assembly is in use.

22. The process of claim 20 further comprising the step of forming a tire/wheel assembly by mounting said tire upon said particular wheel in an orientation which minimizes vibration in said direction when said tire/wheel assembly is in use.

23. The process of claim 20 wherein step (b) thereof includes the steps of:

(i) for each said wheel in said group of wheels, measuring a first parameter correlated to said tendency of said wheel to cause said vibration, and (ii) sorting said wheels in said group of wheels into a predetermined order according to the magnitudes of said first parameter to determine said wheel rank designation for each of said wheels in said group.

24. The process of claim 23 wherein said order is either a non-decreasing numerical order or a non-increasing numerical order.

25. The process of claim 23 wherein said first parameter is correlated to the magnitude of the first harmonic of the average radial runout of each said wheel.

26. The process of claim 23 wherein said first parameter is correlated to both the magnitude and angle of the first harmonic of the average radial runout of each said wheel.

27. The process of claim 20 wherein said group of wheels contains N wheels and said tire and said plurality of other tires together form a group of N tires.

28. The process of claim 20 wherein step (c) thereof includes the steps of:

(i) for a group of N tires including said tire and N-1 said other tires, measuring a second parameter correlated to said tendency of said tires to cause said vibration, and (ii) sorting said tires in said group of tires into order according to the magnitudes of said second parameter to determine said tire rank designation of said tire.

29. The process of claim 28 wherein said order is either a non-decreasing numerical order or a non-increasing numerical order.

30. The process of claim 20 wherein said populations of tires and wheels are each at least M units in number and wherein:

$$N \leq M$$

where N is the number of wheels in said group of wheels.

31. The process of claim 30 wherein N is selected to be a number large enough to provide a representative sample of said population of tires with respect to said tendency of said tires to cause said vibration in tire/wheel assemblies.

32. The process of claim 30 wherein N is selected to be a number large enough to provide a representative sample of said population of wheels with respect to said tendency of said wheels to cause said vibration in tire/wheel assemblies.

33. The process of claim 30 wherein N is selected to be a number large enough to provide representative samples of said population of tires and said population of wheels with respect to a respective tendency of tires and wheels in each respective population to cause said vibration in tire/wheel assemblies.

34. The process of claim 30 wherein N is a number which is both:

(i) smaller than the number of wheels in said population of wheels, and (ii) large enough to provide a representative sample of at least one of said populations with respect to a respective tendency of the tires and/or wheel therein to cause said vibration in tire/wheel assemblies.

35. The process of claim 20 wherein said wheel rank designation is assigned based on the magnitude of a selected harmonic of the average radial runout of each said wheel in said group of wheels as compared to the magnitudes of said selected harmonic of the average radial runouts of said other wheels in said group of wheels.

36. The process of claim 20 wherein said tire rank designation is assigned based on the magnitude of a second parameter of said tire as compared to the magnitudes of said second parameter among said other tires.

37. The process of claim 36 wherein said second parameter is correlated to the first harmonic of radial force variation of said tire.

38. A process for pairing tires and wheels to be formed into tire/wheel assemblies, said process comprising the steps of:

(a) assigning each wheel in a group of N wheels from a population of wheels a wheel rank designation from a series of N wheel rank designations, each said wheel rank designation indicating the relative tendency of a given said wheel to cause vibration in a given direction in tire/wheel assemblies as compared to the other N-1 wheels in said group;

(b) assigning a tire from a population of tires a tire rank designation from a series of N tire rank designations, each said tire rank designation in said series of tire rank designations corresponding to a respective wheel rank designation in said series of wheel rank designations, said assigned tire rank designation indicating the relative tendency of said tire to cause vibration in said given direction in tire/wheel assemblies as compared to N-1 other tires from said population of tires, and (c) pairing said tire with that wheel from among said group of wheels having a wheel rank designation which corresponds to the tire rank designation of said tire.

39. A process for pairing tires and wheels to be formed into tire/wheel assemblies, said process comprising the steps of:

(a) assigning each tire in a group of tires from a population of tires a tire rank designation from a series of tire rank designations, each said tire rank designation indicating the relative tendency of a given said tire to cause vibration in a given direction in tire/wheel assemblies as compared to the other tires in said group of tires;

(b) assigning a wheel from a population of wheels a wheel rank designation from a series of wheel rank designations, each wheel rank designation in said series of wheel rank designations corresponding to a respective tire rank designation in said series of tire rank designations, said assigned wheel rank designation indicating the relative tendency of said wheel to cause vibration in tire/wheel assemblies as compared to a plurality of other wheels from said population of wheels, and (c) pairing said wheel with that particular tire from among said group of tires having a tire rank designation which corresponds to the wheel rank designation of said wheel.

40. The process of claim 39 further comprising the step of forming a tire/wheel assembly by mounting said tire upon said particular wheel in an orientation which minimizes vibration in said direction when said tire/wheel assembly is in use.

41. The process of claim 39 wherein step (a) thereof includes the steps of:

(i) for each said tire in said group of tires, measuring a first parameter correlated to said tendency of said tire to cause said vibration, and (ii) sorting the tires in said group of tires into predetermined order according to the magnitudes of said first parameter to determine said tire rank designation for each of said tires in said group of tires.

42. The process of claim 41 wherein said predetermined order is either a non-decreasing numerical order or a non-increasing numerical order.

43. The process of claim 41 wherein said first parameter is correlated to the first harmonic of the radial force variation of each said tire.

44. The process of claim 41 wherein said first parameter is correlated to both the magnitude and angle of the first harmonic of the radial force variation of each said tire.

45. The process of claim 39 wherein step (b) thereof includes the steps of:

(i) for a group of N wheels including said wheel and N-1 said other wheels, measuring a second parameter correlated to said tendency of said wheels to cause said vibration, and (ii) sorting said wheels in said group of wheels into a predetermined order according to the magnitudes of said second parameter to determine said tire rank designation of said tire.

46. The process of claim 45 wherein said predetermined order is either a non-decreasing numerical order or a non-increasing numerical order.

47. The process of claim 45 wherein direction is the radial direction and said second parameter is correlated to the average radial runout of said wheels.

48. The process of claim 47 wherein said second parameter is correlated to the first harmonic of average radial runout of said wheels.

49. The process of claim 39 wherein said populations of tires and wheels are each at least M units in number and wherein:

$N \leq M$ where N is the number of tires in said group of tires.

50. The process of claim 49 wherein N is selected to be a number large enough to provide representative samples of said population of tires and said population of wheels with respect to a respective tendency of tires and wheels in each respective population to cause said vibration in tire/wheel assemblies.

51. The process of claim 49 wherein N is a number which is both:

(i) smaller than the number of wheels in said population of wheels, and (ii) large enough to provide a representative sample of at least one of said populations with respect to said respective tendency of the tires and/or wheels therein to cause said vibration in tire/wheel assemblies.

52. The process of claim 39 wherein said wheel rank designation is assigned based on the magnitude of a selected harmonic of the average radial runout of a surface feature of each said wheel in said group of wheels as compared to the magnitudes of said selected harmonic of the average radial runouts of said other wheels in said group.

53. The process of claim 39 wherein said tire rank designation is assigned based on the magnitude of a second parameter of said tire as compared to the magnitudes of said second parameter of said other tires.

54. The process of claim 53 wherein said second parameter is correlated to the first harmonic of radial force variation.

55. A process for pairing tires and wheels to be formed into tire/wheel assemblies, said process comprising the steps of:

(a) assigning each tire in a group of N tires from a population of tires a tire rank designation from a series of N tire rank designations, each said tire rank designation indicating the relative tendency of a given said tire to cause vibration in a given direction in tire/wheel assemblies as compared to the other N-1 tires in said group;

(b) assigning a wheel from a population of wheels a wheel rank designation from a series of N wheel rank designations, each said wheel rank designation in said series of wheel rank designations corresponding to a respective tire rank designation in said series of tire rank designations, said assigned wheel rank designation indicating the relative tendency of said wheel to cause vibration in tire/wheel assemblies as compared to N-1 other wheels from said population of wheels; and (c) pairing said wheel with that particular tire from among said group of tires having a tire rank designation which corresponds to the wheel rank designation of said wheel.

56. A process for pairing tires and wheels to be formed into tire/wheel assemblies, said process comprising the steps of:

(a) taking a tire from a population of tires until a group of tires is formed;

(b) assigning each tire in said group a tire rank designation from a series of tire rank designations, each said tire rank designation indicating the relative tendency of a given said tire to cause vibration in a given direction in tire/wheel assemblies as compared to the other tires in said group of tires;

(c) assigning a wheel from a population of wheels a wheel rank designation from a series of N wheel rank designations, each wheel rank designation in said series of wheel rank designations corresponding to a respective tire rank designation in said series of tire rank designations, said assigned wheel rank designation indicating the relative tendency of said wheel to cause vibration in said given direction in tire/wheel assemblies as compared to a plurality of other wheels from said population of wheels;

(d) removing from said group a particular tire having a tire rank designation which corresponds to the wheel rank designation of said wheel and pairing said wheel with said particular tire to be combined as a tire/wheel assembly, and (e) repeating steps (a) through (d), above.

57. The process of claim 56 further comprising the step of, prior to step (d):

forming a tire/wheel assembly by mounting said tire upon said particular wheel in an orientation selected to minimize vibration in said direction when said tire/wheel assembly is in use.

58. The process of claim 56 wherein step (b) thereof includes the steps of:

(i) for each said tire in said group of tires, measuring a first parameter correlated to said tendency of said tire to cause said vibration, and (ii) sorting said tires in said group of tires into a predetermined order according to the magnitudes of said first parameter to determine said tire rank designation for each of said tires in said group.

59. The process of claim 58 wherein said order is either a non-decreasing numerical order or a non-increasing numerical order.

60. The process of claim 58 wherein said first parameter is correlated to the first harmonic of the radial force variation of said tire.

61. The process of claim 58 wherein said first parameter is correlated to both the magnitude and angle of the first harmonic of the radial force variation of said tire.

62. The process of claim 56 wherein step (c) thereof includes the steps of:
(i) for a group of N wheels including said wheel and N-1 said other wheels, measuring a second parameter correlated to said tendency of said wheels to cause said vibration, and
(ii) sorting said wheels in said group of wheels into a predetermined order according to the magnitudes of said second parameter to determine said wheel rank designation of said wheel.

63. The process of claim 62 wherein said order is either a non-decreasing numerical order or a non-increasing numerical order.

64. The process of claim 56 wherein said populations of tires and wheels are each at least M units in number and wherein:

$$N \leq M$$

where N is the number of tires in said group of tires.

65. The process of claim 64 wherein N is selected to be a number large enough to provide a representative sample of said population of tires with respect to said tendency of said tries to cause said vibration in tire/wheel assemblies.

66. The process of claim 64 wherein N is selected to be a number large enough to provide a representative sample of said population of wheels with respect to said tendency of said wheels to cause said vibration in tire/wheel assemblies.

67. The process of claim 64 wherein N is selected to be a number large enough to provide representative samples of said population of tires and said population of wheels with respect to said respective tendencies of tires and wheels in each respective population to cause said vibration in tire/wheel assemblies.

68. The process of claim 64 wherein N is a number which is both:
(i) smaller than the number of tires in said population of tires, and
(ii) large enough to provide a representative sample of at least one of said populations with respect to said respective tendency of the tires and/or wheels therein to cause vibration in tire/wheel assemblies.

69. The process of claim 56 wherein said wheel rank designation is assigned according to the magnitude of the first harmonic of the average radial runout of said wheel as compared to the magnitudes of the first harmonics of the average radial runouts of said other wheels.

70. The process of claim 56 wherein said tire rank designation is assigned based on the magnitude of a parameter of each said tire in said group of tires as compared to the magnitudes of said parameter associated with said other tires in said group.

71. The process of claim 70 wherein said parameter is correlated to the first harmonic of radial force variation of the tire.

72. A process for pairing tires and wheels to be formed into tire/wheel assemblies, said process comprising the steps of:
(a) for each wheel in a group of wheels, measuring the value of a first parameter correlated to a tendency of each said wheel to cause vibration in a given direction in a tire/wheel assembly;
(b) for each tire, in a group of tires, measuring the value of a second parameter correlated to a tendency of each said tire to cause vibration in said direction in a tire/wheel assembly;
(c) sorting said wheels in said group of wheels by their respective first parameter values into a predetermined order of wheel rank designations such that each said wheel in said group of wheels is associated with a given one of said wheel rank designations;
(d) sorting said tires in said group of tires by their respective second parameter values into a corresponding predetermined order of tire rank designations such that each said tire in said group of tires is associated with a given one of said tire rank designations, and
(e) pairing a particular wheel from said group of wheels with a particular tire from said group of tires whose respective wheel rank designation and tire rank designation bear a predetermined relationship to one another.

73. An apparatus for pairing tires and wheels to be formed into tire/wheel assemblies, said apparatus comprising:
(a) means for assigning each wheel in a group of wheels from a population of wheels a wheel rank designation from a series of wheel rank designations, each assigned wheel rank designation indicating the relative tendency of a given said wheel to cause vibration in a given direction in tire/wheel assemblies as compared to the other wheels in said group of wheels;
(b) means for assigning a tire from a population of tires a tire rank designation from a series of tire rank designations, each tire rank designation in said series of tire rank designations corresponding to a respective wheel rank designation in said series of wheel rank designations, said assigned tire rank designation indicating the relative tendency of said tire to cause vibration in a given direction in tire/wheel assemblies as compared to a plurality of other tires from said population of tires; and
(c) means for identifying that particular wheel from among said group of wheels having a wheel rank designation which corresponds to the tire rank designation of said tire.

74. An apparatus for pairing tires and wheels to be formed into tire/wheel assemblies, said apparatus comprising:
(a) wheel measuring means for measuring a first parameter correlated to a tendency of wheels from a population of wheels to cause vibration in a given direction in tire/wheel assemblies;
(b) tire measuring means for measuring a second parameter correlated to a tendency of tires from a population of tires to cause vibration in said direction in tire/wheel assemblies; and (c) computer means communicating with said wheel measuring means and said tire measuring means to receive first parameter measurement data from said wheel measuring means and second parameter measurement data from said tire measuring means for:
  (i) assigning each wheel in a group of wheels from said population of wheels a wheel rank designation from a series of wheel rank designations based on said first parameter data, each assigned wheel rank designation indicating the relative tendency of a given said wheel to cause vibration in a given direction in tire/wheel assemblies as compared to the other wheels in said group of wheels;
  (ii) assigning a tire from said population of tires a tire rank designation from a series of tire rank designations based on said second parameter data, each tire rank designation in said series of tire rank designations corresponding to a respective wheel rank designation in said series of wheel rank designations, said assigned tire rank designation indicating the relative tendency of said tire to cause vibration in a given direction in tire/wheel assemblies as compared to other tires from said population of tires, and
  (iii) identifying that particular wheel from among said group of wheels having a wheel rank designation which corresponds to the tire rank designation of said tire.

75. The apparatus of claim 74 wherein said direction is the radial direction and wherein said first parameter is correlated to the magnitude of a selected harmonic of the average radial runout of said wheels.

76. The apparatus of claim 75 wherein said selected harmonic is the first harmonic.

77. The apparatus of claim 74 wherein said direction is the radial direction and wherein said second parameter is correlated to the magnitude of a selected harmonic of radial force variation of said tires.

78. The apparatus of claim 77 wherein said selected harmonic is the first harmonic.

79. The apparatus of claim 74 wherein said direction is the radial direction and wherein
  (i) said first parameter is correlated to the magnitude of a first selected harmonic of the average radial runout of said wheels, and
  (ii) said second parameter is correlated to the magnitude of a second selected harmonic of radial force variation of said tires.

80. The apparatus of claim 79 wherein said first selected harmonic and said second selected harmonic are both selected to be harmonics of the same order.

81. The apparatus of claim 80 wherein said order is the first order.

82. The apparatus of claim 79 wherein said first parameter is correlated to both the magnitude and angle of said first selected harmonic of the average radial runout of a wheel and wherein said second parameter is correlated to both the magnitude and angle of a said second selected harmonic of tire radial force variation, the angular location on said wheel corresponding to said angle of said first selected harmonic and the angular location on said tire corresponding to said angle of said second selected harmonic, both being identified in order to facilitate orienting said tire and said particular wheel with reference to said angular locations to minimize said vibration when they are combined to form a tire/wheel assembly.

83. An apparatus for pairing tires and wheels to be formed into tire/wheel assemblies, said apparatus comprising:
  (a) means for assigning each wheel in a group of N wheels from a population of wheels a wheel rank designation from a series of N wheel rank designations, each assigned wheel rank designation indicating the relative tendency of a given said wheel to cause vibration in a given direction in tire/wheel assemblies as compared to the other N-1 wheels in said group of wheels;
  (b) means for assigning a tire from a population of tires a tire rank designation from a series of N tire rank designations, each tire rank designation in said series of tire rank designations corresponding to a respective wheel rank designation in said series of wheel rank designations, said assigned tire rank designation indicating the relative tendency of said tire to cause vibration in a given direction in tire/wheel assemblies as compared to N-1 other tires from said population of tires, and
  (c) means for identifying that particular wheel from among said group of wheels having a wheel rank designation which corresponds to the tire rank designation of said tire.

84. An apparatus for pairing tires and wheels to be formed into tire/wheel assemblies, said apparatus comprising:
  (a) means for assigning each tire in a group of tires from a population of tires a tire rank designation from a series of tire rank designations, each assigned tire rank designation indicating the relative tendency of a given said tire to cause vibration in a given direction in tire/wheel assemblies as compared to the other tires in said group of tires;
  (b) means for assigning a wheel from a population of wheels a wheel rank designation from a series of wheel rank designations, each wheel rank designation in said series of wheel rank designations corresponding to a respective tire rank designation in said series of tire rank designations, said assigned wheel rank designation indicating the relative tendency of said wheel to cause vibration in a given direction in tire/wheel assemblies as compared to a plurality of other wheels from said population of tires, and
  (c) means for identifying that particular tire from among said group of tires having a tire rank designation which corresponds to the wheel rank designation of said wheel.

85. An apparatus for pairing tires and wheels to be formed into tire/wheel assemblies, said apparatus comprising:
  (a) tire measuring means for measuring a first parameter correlated to a tendency of tires from a population of tires to cause vibration in a given direction in tire/wheel assemblies;
  (b) wheel measuring means for measuring a second parameter correlated to a tendency of wheels from a population of wheels to cause vibration in said direction in tire/wheel assemblies; and
  (c) computer means communicating with said tire measuring means and said wheel measuring means to receive first parameter measurement data from said tire measuring means and second parameter measurement data from said wheel measuring means for:

(i) assigning each tire in a group of tires from said population of tires a tire rank designation from a series of tire rank designations based on said first parameter data, each assigned tire rank designation indicating the relative tendency of a given said tire to cause vibration in said direction in tire/wheel assemblies as compared to the other tires in said group of tires;

(ii) assigning a wheel from said population of wheels a wheel rank designation from a series of wheel rank designations based on said second parameter data, each wheel rank designation in said series of wheel rank designations corresponding to a respective tire rank designation in said series of tire rank designations, said assigned wheel rank designation indicating the relative tendency of said wheel to cause vibration in said direction in tire/wheel assemblies as compared to other wheels from said population of wheels, and (iii) identifying that particular tire from among said group of tires having a tire rank designation which corresponds to the wheel rank designation of said wheel.

86. The apparatus of claim 85 wherein said direction is the radial direction and wherein said first parameter is correlated to the magnitude of a selected harmonic of tire radial force variation.

87. The apparatus of claim 86 wherein said selected harmonic is the first harmonic.

88. The apparatus of claim 85 wherein said direction is the radial direction and wherein said second parameter is correlated to the magnitude of a selected harmonic of the average radial runout of said wheels.

89. The apparatus of claim 88 wherein said selected harmonic is the first harmonic.

90. The apparatus of claim 85 wherein said direction is the radial direction and wherein (i) said first parameter is correlated to the magnitude of a first selected harmonic of radial force variation of said tires, and (ii) said second parameter is correlated to the magnitude of a second selected harmonic of the average radial runout of said wheels.

91. The apparatus of claim 90 wherein said first selected harmonic and said second selected harmonic are both selected to be harmonics of the same order.

92. The apparatus of claim 91 wherein said order is the first order.

93. The apparatus of claim 85 wherein said direction is the radial direction and said first parameter is correlated to the magnitude and angle of a first selected harmonic of radial force variation of said tires and wherein said second parameter is correlated to both the magnitude and angle of a second selected harmonic of the average radial runout of said wheels, the angular location on said tire corresponding to said angle of said first selected harmonic and the angular location on said wheel corresponding to said angle of said second selected harmonic, both being identified in order to facilitate orienting with reference to said angular locations said tire and said particular wheel to minimize said vibration in said direction when they are combined to form a tire/wheel assembly.

94. An apparatus for pairing tires and wheels to be formed into tire/wheel assemblies, said apparatus comprising:

(a) tire measuring means for measuring a first parameter correlated to a tendency of tires from a population of tires to cause vibration in a given direction in tire/wheel assemblies;

(b) wheel measuring means for measuring a second parameter correlated to a tendency of wheels from a population of wheels to cause vibration in said direction in tire/wheel assemblies; and (c) computer means, communicating with said tire measuring means and said wheel measuring means, for:

(i) ranking said wheels with wheel rank designations assigned by comparing the magnitude of said first parameter associated with each of said wheels with the magnitudes of said first parameter associated with other wheels from said population of wheels;

(ii) ranking said tires with tire rank designations assigned by comparing the magnitude of said second parameter associated with each of said tires with the magnitudes of said second parameter associated with other tires from said population of tires, and (iii) pairing tires and wheels whose respective rank designations bear a predetermined relationship to one another.

95. A process comprising the step of:

forming a tire/wheel assembly by mounting a tire from a group of tires upon a wheel from a group of wheels in a mutual orientation selected to minimize operational vibration of said tire/wheel assembly in a predetermined direction, said tire being that tire from said group of tires whose relative tendency to generate operational vibration in said direction as compared to the remaining tires in said group of tires bears a predetermined relationship to a relative tendency of said wheel to generate operational vibration in said direction as compared to the remaining wheels in said group of wheels.

96. The process of claim 95 wherein determining said relative tendency of said wheel to generate said operational vibration comprises the steps of:

(i) for each wheel in said group of wheels, measuring a wheel nonuniformity indicating parameter, and (ii) sorting said wheels in said group of wheels into order according to the magnitudes of their respective wheel non-uniformity indicating parameter measurements.

97. The process of claim 95 wherein determining said relative tendency of said tire to generate said operational vibration comprises the steps of:

(i) for each tire in said group of tires, measuring a wheel nonuniformity indicating parameter, and (ii) sorting said tires in said group of tires into order according to the magnitudes of their respective tire nonuniformity indicating parameter measurements.

* * * * *